United States Patent

Masuda et al.

[15] 3,657,686

[45] Apr. 18, 1972

[54] GALVANO-MAGNETRO EFFECT APPARATUS

[72] Inventors: Noboru Masuda, Kawaguchi; Takeshi Hidai, Yokohama, both of Japan

[73] Assignee: Denki Onkyo Co., Ltd.

[22] Filed: Dec. 11, 1970

[21] Appl. No.: 97,098

[30] Foreign Application Priority Data

Dec. 17, 1969 Japan..................................44/119915

[52] U.S. Cl..............................338/32 H, 323/94 H, 324/46

[51] Int. Cl...........................................................H01c 7/16

[58] Field of Search .....................338/32 R, 32 H; 323/94 H; 324/45, 46; 335/1, 207; 307/309; 317/235 H

[56] References Cited

UNITED STATES PATENTS 3,286,161 11/1956 Jones et al........................338/32 R X

OTHER PUBLICATIONS

J. J. McDowell, Magnetoresistive Contactless Switch, " IBM Technical Disclosure Bulletin," Vol. 12, No. 3, pp. 436–437, Aug. 1969.

*Primary Examiner*—C. L. Albritton
*Attorney*—James E. Armstrong and Ronald S. Cornell

[57] ABSTRACT

A galvano-magnetro effect apparatus comprised of a substrate with excellent electric insulating ability, at least one galvano-magnetro effect device which is fixed on the substrate, a magnet which is provided opposite to the device so that the magnetic flux is applied to the device and the density of the magnetic flux may be varied, and a load which is fixed on the substrate while being isolated from the device so that it is not affected by the magnetic flux of the magnet and is connected to the device with a conductor.

7 Claims, 6 Drawing Figures

GALVANO-MAGNETRO EFFECT APPARATUS

BACKGROUND OF THE INVENTION

The present invention relates to an apparatus employing a galvano-magnetro effect device such as, for example, a Hall effect device, a magneto-resistance effect device, etc.

The construction of conventional apparatus of this type is disadvantageous as described below because a galvano-magnetro effect device and a load provided with circuit elements, such as transistors or resistors, which are connected to the device or to the load with integrated elements, are respectively fixed at the substrates.

Since the load and the galvano-magnetro effect device are provided on the separate substrates in different assembly processes, the number of production processes increases. The substrates are too small to handle conveniently and it is difficult to make the apparatus compact because the total area of the assembled substrates is large.

Since the elements for the load and the device are attached to separate substrates the temperature atmosphere of both articles becomes unequal. From this reason, when many devices are used, the temperature atmospheres of the devices differ from each other.

The present invention is intended to provide a galvano-magnetro effect device in a simple and inexpensive construction, whereby said demerits are eliminated.

SUMMARY

The present invention provides a galvano-magnetro effect device comprised of one substrate made of a material, such as ferrite or glass, with excellent electrical insulation ability, at least one galvano-magnetro effect device which is bonded to the substrate, a magnet which is arranged so that magnetic flux can be applied to the galvano-magnetro effect device and the magnetic flux density can be varied, at least one load which is bonded to the substrate so that the load is not exposed to the magnetic flux of the magnet and is isolated from the galvano-magnetro effect device, a conductive path which electrically connects the load and the galvano-magnetro effect device and terminals which are provided at the end of the substrate to connect the load and the galvano-magnetro effect device to an external power supply and load circuit.

BRIEF DESCRIPTION OF THE DRAWINGS

The present invention is illustrated in detail in the accompanying drawings whereof.

DETAILED DESCRIPTION

Figure 1:
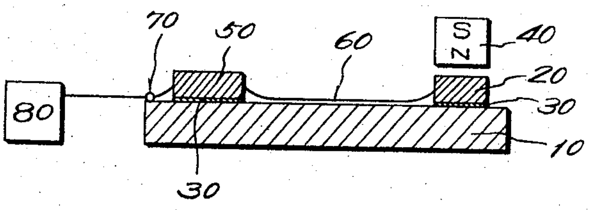
FIG. 1 is a cross-sectional front view of the apparatus of the present invention.
Figure 2:
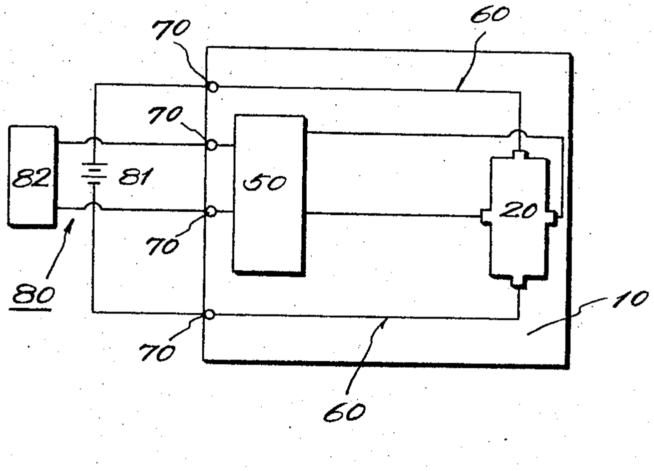
FIG. 2 is a plan view of the apparatus shown in FIG. 1.
Figure 3:
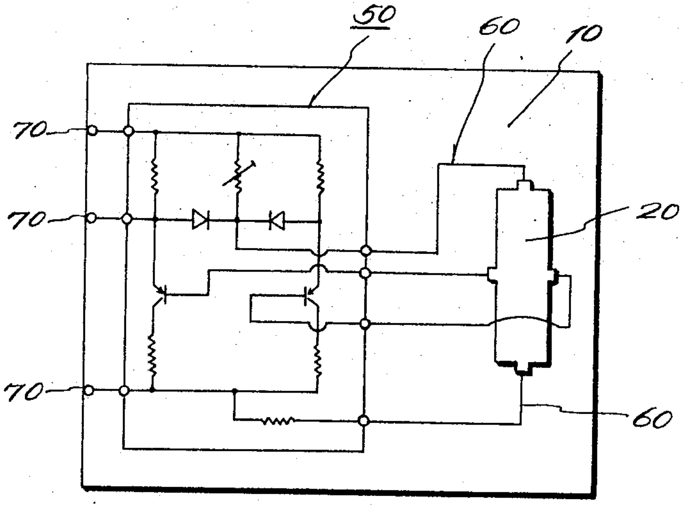
FIG. 3 is a circuit diagram showing an embodiment of the apparatus of FIG. 2.

Referring to FIGS. 1 to 3, there is shown a galvano-magnetro effect apparatus which is comprised of one unitary substrate 10 with excellent electrical insulation characteristics, at least one Hall effect device-type galvano-magnetro effect device 20 (hereinafter referred to as the "device") which is fixed with bonding agent 30 onto substrate 10, magnet 40 which is arranged at the upper portion of device 20 so that one magnetic pole is positioned opposite to the device and is made to closely approach to or separate from device 20 by an actuating means such as, for example, a push-button cap, etc. (which is not shown), load 50 such as, for example, an integrated circuit, an actuated element (for example, a transistor) or other circuitry (for example, a resistor and capacitor) which is fixed with bonding agent 30 at a position isolated from device 20 so that the load is not exposed to the magnetic flux of magnet 40, conductive paths 60 such as, for example, printed wires or lead wires, which electrically connect device 20 and load 50, and a plurality of terminals 70 which connect external circuit 80, which has power supply 81 and external load circuit 82, in addition to device 20 and load 50.

The material of substrate 10 is a matter of choice. If a magnetic material such as ferrite is used, the concentration effect of the magnetic flux can be improved because the reluctance between the substrate and the device becomes small.

The apparatus according to the present invention is as described above. Load 50 can be actuated by changing the output voltage or current of device 20 while magnet 40 is forced to closely approach to and separate from device 20.

Load 50 can be a single element but, conveniently, integrated circuits formed as shown in FIG. 3 are often used.

Since the apparatus according to the present invention is constructed and arranged as described above, it offers the following advantages:

Since load 50 and device 20 can be mounted together on substrate 10 at the same time, the overall area of the substrate will be greater than that of a conventional single substrate and thus handling and assembly become easier. Therefore, the apparatus can be made compact because the area of the substrate of the apparatus is smaller than the total area of conventional single substrates when combined.

Figure 4:
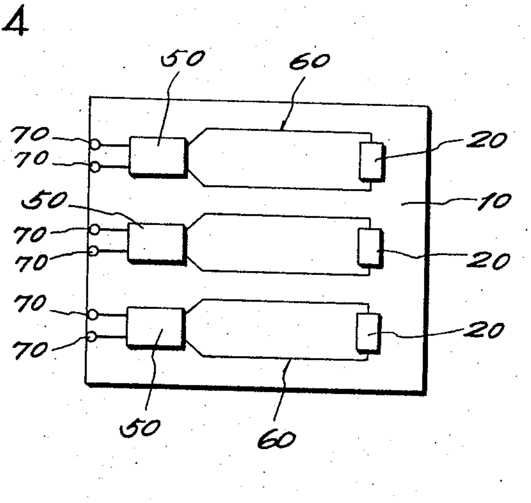
FIGS. 4 and 5 are the plan views showing other embodiments of the apparatus of the present invention.

Hereupon a number of devices 20 can be fixed on substrate 10 as shown in FIG. 4. In this case, the temperatures at all devices 20 can be equal and therefore it is easier to compensate the thermal characteristics of devices 20.

Figure 5:
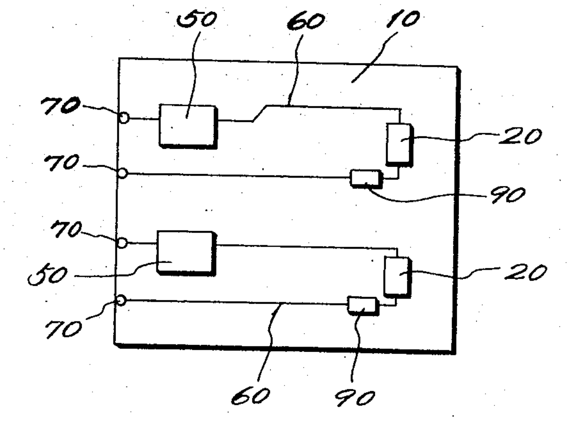
Figure 6:
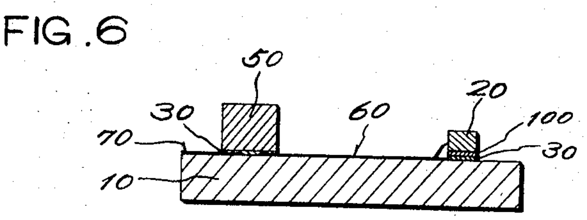
FIG. 6 is a cross-sectional front view showing another embodiment of the apparatus of the invention.

Temperature sensing type compensator elements 90 such as, for example, thermistors, can be provided on substrate 10 to compensate the thermal characteristics of devices 20, as shown in FIG. 5. In this case, it is desirable to arrange elements 90 near devices 20. Since devices 20 and elements 90 are arranged on substrate 10, they can be positioned in the same temperature atmosphere and the compensation effect of the thermal characteristics of the devices can be vastly improved. In this case, it is desirable to make the substrate with a material of excellent heat conductivity.

Load 50 need not be respectively connected to device 20; for instance, a plurality of loads 50 can be connected to one device 20 or one load 50, for example an integrated circuit, can be connected to a plurality of devices 20. The means to fix device 20 on substrate 10 is optional; for example, the method using bonding agent 30, metallization or photo-etching can be used to form device 20 directly onto the substrate.

Device 20 can be fixed in advance on magnetic setting piece 100, which can be fixed onto substrate 10 with a bonding agent. Since the magnetic flux in this case can be efficiently concentrated onto device 20 by the setting piece, substrate 10 can be made of a thermosetting synthetic resin such as, for example, phenol resin. Accordingly, the apparatus is advantageous because conductive paths 60 can be printed on the substrate which serves as a printed circuit board and load 50 can be easily attached.

What is claimed is:

1. A galvano-magnetro effect apparatus comprising
   - a. a unitary substrate with excellent electric insulation characteristics;
   - b. at least one galvano-magnetro effect device which is fixed on the substrate;
   - c. a magnet which is provided to oppose the device so that the magnetic flux can be applied to the galvano-magnetro effect device and the density of magnetic flux can be varied;
   - d. at least one load which is fixed at a position isolated from the galvano-magnetro effect device on the substrate so that the load is not exposed to the magnetic flux of the magnet;
   - e. a conductive path which electrically connects the load and the galvano-magnetro effect device, and
   - f. means to connect the galvano-magnetro effect device and the load to an external circuit.

2. A galvano-magnetro effect apparatus according to claim 1, wherein the substrate is a magnetic material.

3. A galvano-magnetro effect apparatus according to claim 1, wherein the substrate is provided with at least one temperature sensing type compensation element which compensates the thermal characteristic of the galvano-magnetro effect device.

4. A galvano-magnetro effect apparatus according to claim 1, wherein the galvano-magnetro effect device is fixed to a setting piece made of a magnetic material and the device is fixed onto the substrate through the setting piece.

5. A galvano-magnetro effect apparatus according to claim 4, wherein the substrate is a thermosetting resin and serves as a printed circuit board for the conductive path.

6. A galvano-magnetro effect apparatus according to claim 1, wherein a plurality of galvano-magnetro effect devices are connected to one load.

7. A galvano-magnetro effect apparatus according to claim 1, wherein one galvano-magnetro effect device is connected to a plurality of loads.

* * * * *